US012768634B2

(12) United States Patent
Ricketts et al.

(10) Patent No.: US 12,768,634 B2
(45) Date of Patent: Oct. 20, 2026

(54) ALIGNMENT GAUGE FOR VEHICLES

(71) Applicant: Honda Motor Co., Ltd., Tokyo (JP)

(72) Inventors: Brandon E Ricketts, Marysville, OH (US); Shane M Englert, Sunbury, OH (US); Andrew C. Price, West Mansfield, OH (US); Robert M Kress, Marysville, OH (US); Bryan Lee Allard, Richwood, OH (US); David T. Christian, Jr., Troy, OH (US)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 18/604,813

(22) Filed: Mar. 14, 2024

(65) Prior Publication Data

US 2025/0290740 A1 Sep. 18, 2025

(51) Int. Cl.
*G01B 5/255* (2006.01)

(52) U.S. Cl.
CPC .......... *G01B 5/255* (2013.01); *G01B 2210/12* (2013.01)

(58) Field of Classification Search
CPC ...................................................... G01B 5/255
USPC .............................................. 33/203, 203.18
See application file for complete search history.

(56) References Cited

U.S. PATENT DOCUMENTS

| | | | | | |
|---|---|---|---|---|---|
| 1,652,848 | A * | 12/1927 | Wanger | G01B 5/255 | 33/193 |
| 1,696,290 | A * | 12/1928 | Archer | G01B 5/255 | 33/203.17 |
| 2,160,226 | A | 5/1939 | Phillips | | |
| 2,522,066 | A * | 9/1950 | Smith | G01B 5/255 | 33/203.17 |
| 3,188,747 | A | 6/1965 | Race | | |
| 3,199,208 | A * | 8/1965 | Hunter | G01B 5/255 | 33/336 |
| 3,423,839 | A | 1/1969 | Liskey | | |
| 4,106,208 | A | 8/1978 | Hunter | | |
| 4,151,655 | A * | 5/1979 | Makarainen | B60B 3/14 | 33/523 |
| 4,185,917 | A * | 1/1980 | Alsina | G01B 11/275 | 33/336 |
| 4,341,021 | A * | 7/1982 | Beissbarth | G01B 7/315 | 33/203.18 |

(Continued)

FOREIGN PATENT DOCUMENTS

| | | | |
|---|---|---|---|
| CN | 103048147 | B | 5/2015 |
| CN | 213714234 | U | 7/2021 |

(Continued)

*Primary Examiner* — George B Bennett
(74) *Attorney, Agent, or Firm* — Joshua Freier; American Honda Motor Co., Inc.

(57) ABSTRACT

An alignment gauge for aligning a hub of a vehicle is provided. The alignment gauge includes a first gauge component having a first slot to receive a first hub of the vehicle. The alignment gauge further includes a second gauge component having a second slot to receive a second hub of the vehicle. The second hub and the first hub are separated from each other, via an axle carrier of the vehicle. The alignment gauge further includes a retractable cable component that couples with at least one of the first gauge component or the second gauge component, and span between the first gauge component and the second gauge component, to align at least of the first hub or the second hub of the vehicle.

7 Claims, 7 Drawing Sheets

(56) References Cited

U.S. PATENT DOCUMENTS

| | | | | |
|---|---|---|---|---|
| 4,629,317 | A * | 12/1986 | January | G01B 11/275 356/139.09 |
| 4,690,557 | A | 9/1987 | Wiklund | |
| 4,827,623 | A * | 5/1989 | Goodell | G01B 11/275 33/203.18 |
| 5,531,030 | A * | 7/1996 | Dale, Jr. | G01B 11/2755 33/203.18 |
| 5,619,800 | A * | 4/1997 | Unruh | G01B 5/255 33/203.18 |
| 5,636,016 | A * | 6/1997 | Coetsier | G01B 11/2755 356/139.09 |
| 6,412,183 | B1 | 7/2002 | Uno | |
| 6,453,567 | B1 | 9/2002 | Naruse | |
| 7,610,685 | B2 * | 11/2009 | Percival | G01B 5/0025 33/203.18 |
| 7,640,673 | B2 * | 1/2010 | Jackson | G01B 11/2755 356/139.09 |
| 7,934,421 | B2 * | 5/2011 | Olex | G01M 17/013 73/146 |
| 7,941,935 | B2 * | 5/2011 | Khan | G01B 5/255 33/645 |
| 8,904,653 | B1 * | 12/2014 | Miaskiewicz | G01B 11/2755 33/203.18 |
| 9,719,817 | B2 | 8/2017 | Ham et al. | |
| 11,466,981 | B2 | 10/2022 | Mambrilla et al. | |
| 2002/0088133 | A1 * | 7/2002 | McMillan | G01B 3/11 33/413 |
| 2003/0159298 | A1 | 8/2003 | Mieling | |
| 2004/0128844 | A1 * | 7/2004 | Robb | G06T 7/70 33/203.18 |

FOREIGN PATENT DOCUMENTS

| | | |
|---|---|---|
| CN | 111457828 B | 10/2021 |
| JP | H06278641 A | 10/1994 |

* cited by examiner

ALIGNMENT GAUGE FOR VEHICLES

BACKGROUND

Vehicles may generally have multiple components (such as, hubs, wheels, etc.) that may require alignment during an assembly process of such components in an assembly line. For example, in an assembly process, some components (such as hubs, wheels, etc.) may be manually aligned by an operator to maintain a balance and a stability of the vehicle. In certain cases, there may be bulky alignment tools (for example, a laser alignment system) that may be configured to align the components of the vehicle. However, as the bulky alignment tools generally have a large volume and a heavy weight, it may be difficult for an operator to control such bulky alignment tools in the assembly line to align the components of the vehicle. Further, if there is a defect in a specific part of such bulky alignment tools, it may be difficult for the operator to replace such specific part due to its high cost.

Further limitations and disadvantages of conventional and traditional approaches will become apparent to one of skill in the art, through comparison of described systems with few aspects of the present disclosure, as set forth in the remainder of the present application and with reference to the drawings.

SUMMARY

According to an embodiment of the disclosure, an alignment gauge may be provided to perform alignment of a hub of a vehicle. The alignment gauge may include a first gauge component that may have a first slot to receive a first hub of the vehicle. The alignment gauge may further include a second gauge component that may have a second slot to receive a second hub of the vehicle. The first hub of the vehicle and the second hub of the vehicle may be separated from each other, via an axle carrier of the vehicle. The alignment gauge may further include a retractable cable component that may be configured to couple with at least one of: the first gauge component or the second gauge component. The retractable cable component may span between the first gauge component and the second gauge component to align at least one of: the first hub or the second hub of the vehicle.

According to another embodiment of the disclosure, an alignment gauge may be provided to perform alignment of a hub of a vehicle. The alignment gauge may include a first gauge component that may have a first slot to receive a first hub of the vehicle. The alignment gauge may further include a second gauge component that may have a second slot to receive a second hub of the vehicle. The first hub of the and the second hub of the vehicle may be separated from each other, via an axle carrier of the vehicle. The alignment gauge may further include a retractable cable component that may be configured to couple with at least one of: the first gauge component or the second gauge component. The retractable cable component may span between the first gauge component and the second gauge component to align at least one of: the first hub or the second hub of the vehicle. The alignment gauge may further include a protractor plate configured to be coupled with at least one of: the first gauge component and the second gauge component. The protractor plate may have a visual marker configured to align at least one of: the first hub or the second hub of the vehicle.

According to another embodiment of the disclosure, a method may be provided to perform alignment of a hub of a vehicle. The method may include disposing a first gauge component having a first slot that may be configured to be coupled to a first hub of the vehicle. The method may further include disposing a second gauge component having a second slot that may be configured to be coupled to a second hub of the vehicle. The first hub and the second hub of the vehicle may be separated from each other, via an axle carrier of the vehicle. The method may further include pulling a cable from a retractable cable component that may be configured to be coupled with at least one of: the first gauge component or the second gauge component. The method may further include coupling the cable with at least one of: the first gauge component or the second gauge component. The cable may span between the first gauge component and the second gauge component. The method may further include aligning at least one of: the first hub or the second hub of the vehicle using alignment of the cable with a visual marker of a protractor plate. The protractor plate may be coupled with at least one of: the first gauge component or the second gauge component.

Figure 1A:
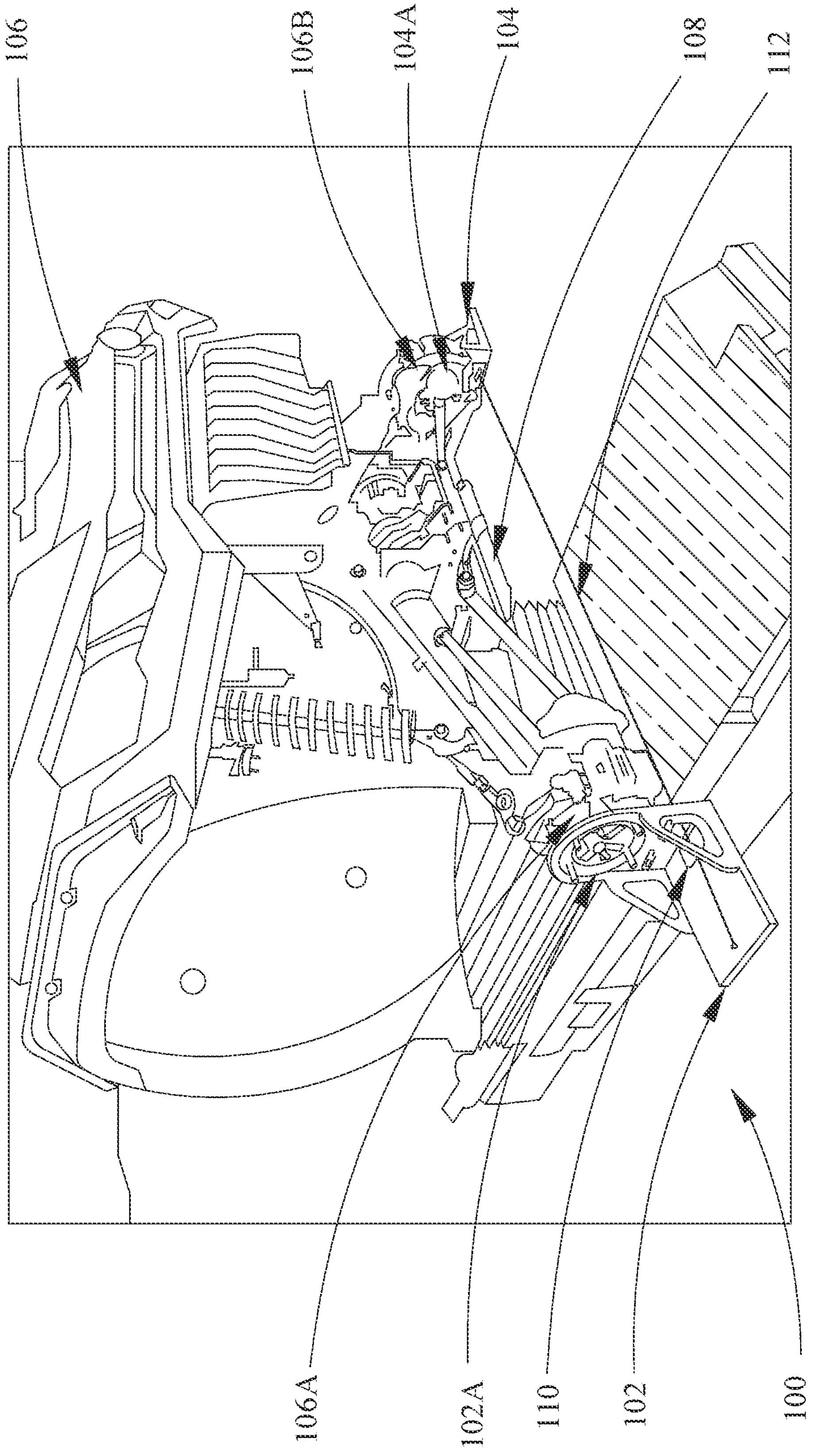
FIG. 1A is a diagram that illustrates a perspective view of an alignment gauge, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in an alignment gauge. Exemplary aspects of the disclosure may provide the alignment gauge which may be coupled to a vehicle to perform alignment of a specific component (for example, a hub) of the vehicle. The alignment gauge may include a first gauge component and a second gauge component. The first gauge component may include a first slot to receive a first hub of the vehicle. The second gauge component may include a second slot to receive a second hub of the vehicle. The first hub and the second hub may be separated from each other, via an axle carrier of the vehicle. The alignment gauge may be provided with a retractable cable component that may be configured to be coupled with at least one of: the first gauge component or the second gauge component. The retractable cable component may span between the first gauge component and second gauge component, to align at least one of: the first hub or the second hub of the vehicle.

In an alignment event, the retractable cable component may release a cable (for example, a lightweight cable) that may span between the first hub and the second hub of the vehicle. As each of the first gauge component and the second gauge component has a light weight and a minimal volume, it may be easier for an operator to control the first gauge component or the second gauge component and align the hub of the vehicle in an assembly line. In case of abnormality in the alignment gauge, the operator may replace the cable of the retractable cable component at ease with a minimal maintenance cost, compared to bulky alignment tools (for example, a laser alignment system).

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1A is a diagram that illustrates a perspective view of an alignment gauge, in accordance with an embodiment of the disclosure. With reference to the FIG. 1, there is shown a diagram that include an alignment gauge 100. The alignment gauge 100 may include a first gauge component 102 and a second gauge component 104. The first gauge component 102 may include a first slot 102A to receive a first hub 106A of a vehicle 106. The second gauge component 104 may include a second slot 104A to receive a second hub 106B of the vehicle 106. The first hub 106A and the second hub 106B of the vehicle 106 may be separated from each other, via an axle carrier 108 of the vehicle 106.

The alignment gauge 100 may further include a retractable cable component 110 configured to be coupled with at least one of: the first gauge component 102 or the second gauge component 104. The retractable cable component 110 may span between the first gauge component 102 and the second gauge component 104, to align at least one of: the first hub 106A or the second hub 106B. The retractable cable component 110 may include a cable 112 that may span between the first gauge component 102 and the second gauge component 104, to align at least one of: the first hub 106A or the second hub 106B of the vehicle 106.

The alignment gauge 100 may have a portable structure, that may allow the operator to carry it along with the vehicle 106. Further, the alignment gauge 100 may have a small size compared to the bulky alignment tools (for example, the laser alignment system). Therefore, it may be easier to carry the alignment gauge 100 adjacent to the vehicle 106 and align hubs (such as, the first hub 106A and the second hub 106B) of the vehicle 106. In an alternate embodiment, the alignment gauge 100 may also be used for alignment of the other components (such as, a wheel, etc.) of the vehicle 106.

The alignment gauge 100 may be shown to have a substantially rectangular shape, as shown in FIG. 1A. However, the alignment gauge 100 may also be formed with various shapes (for example, a substantially square shape, a substantially rectangular shape, and the like). In an embodiment, the alignment gauge 100 may be made from high strength material, composite material, light weight material, or elastic material (for example, a stainless-steel material, a titanium material, a tungsten material, a plastic composite, polymer, fiber and the like) to provide optimal strength or stiffness to the alignment gauge 100. In a preferred embodiment, the material for alignment gauge 100 may be formed from the stainless-steel material, which may provide a high strength and a durability to the alignment gauge 100. The alignment gauge 100 may include a pair of gauge components, which may be used in a combined manner.

The first gauge component 102 may be arranged in proximity to the first hub 106A of the vehicle 106 and the second gauge component 104 may be arranged in proximity of the second hub 106B of the vehicle 106. The first gauge component 102 and the second gauge component 104 may be configured to receive either the first hub 106A or the second hub 106B of the vehicle 106. To facilitate receiving at least one of: the first hub 106A and the second hub 106B of the vehicle 106, each of the first gauge component 102 and the second gauge component 104 may be provided with a slot (such as, the first slot 102A and the second slot 104A). For example, the first gauge component 102 may be provided with the first slot 102A and the second gauge component 104 may be provided with the second slot 104A. The first slot 102A of the first gauge component 102 may receive the first hub 106A of the vehicle 106. The second slot 104A of the second gauge component 104 may receive the second hub 106B of the vehicle 106.

The first hub 106A and the second hub 106B may be separated from each other via the axle carrier 108 of the vehicle 106. The axle carrier 108 of the vehicle 106 may connect the first hub 106A and the second hub 106B with each other. In the alignment event, the first hub 106A and the second hub 106B may be required to remain in connection with each other to facilitate an optimal alignment between the first hub 106A and the second hub 106B.

Figure 2A:
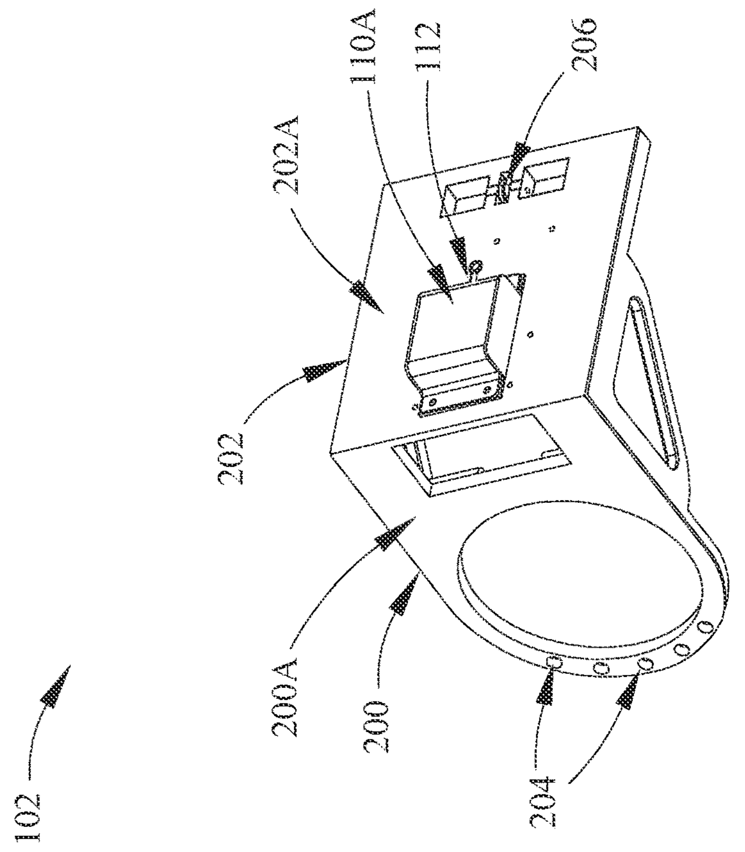
FIGS. 2A and 2B are diagrams that illustrate a perspective view of a first gauge component, in accordance with an embodiment of the disclosure.

The alignment gauge 100 may further include the retractable cable component 110 which may be configured to be coupled with at least one of: the first gauge component 102 and the second gauge component 104. The retractable cable component 110 may be formed as a rectangular shape (as shown in FIG. 2A). The retractable cable component 110 may also include other shapes, for example, but not limited to, a circular shape, a polygonal shape, and the like. The retractable cable component 110 may span between the first gauge component 102 and the second gauge component 104, to align at least one of: the first hub 106A and the second hub 106B of the vehicle 106. In an embodiment, the retractable cable component 110 may include the cable 112, which may be coiled and accommodated inside the retractable cable component 110.

The cable 112 may span or extend between the first gauge component 102 and the second gauge component 104, which may be configured to align at least one of: the first hub 106A and the second hub 106B of the vehicle 106. The cable 112 may be made from various materials including, but not limited to, a stainless-steel material, a nylon material, or a composite material, such as, a Kevlar material based on the operator's preference. The cable 112 may be selected based on its high strength properties, water resistance properties, friction resistance properties, durability properties, and the like. Further, the cable 112 may be fabricated at an optimal cost. Therefore, in case of abnormality in the alignment gauge 100, the operator may replace the cable 112 with ease, and also ensure that there may be a minimal maintenance cost for the alignment gauge 100.

Figure 2B:
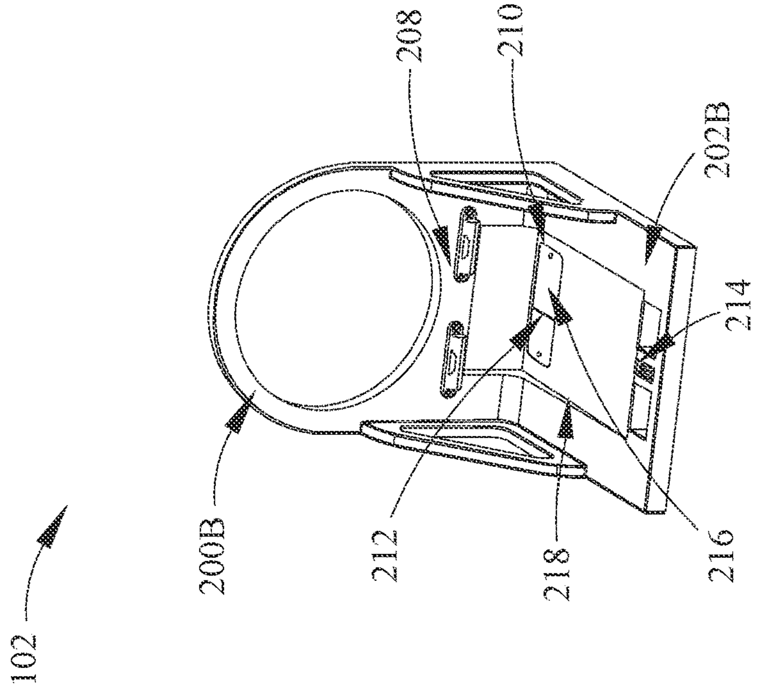
Figure 2C:
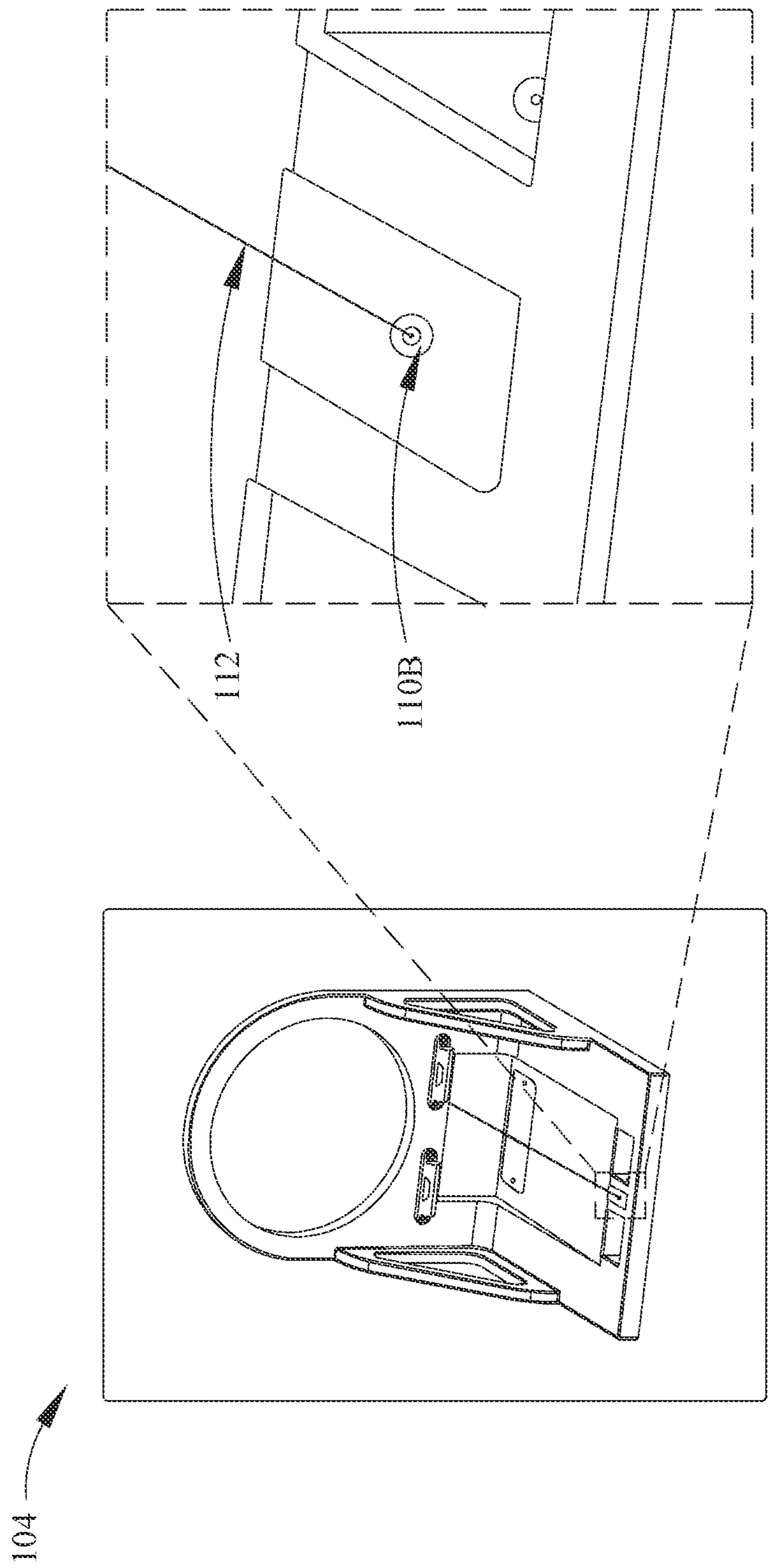
FIG. 2C is a diagram that illustrates a perspective view of a second cable component of a second gauge component, in accordance with an embodiment of the disclosure.

The retractable cable component 110 or retractable cable components may include a first cable component 110A (as shown in FIG. 2A) and a second cable component 110B (as shown in FIG. 2C). The first cable component 110A may be coupled to the first gauge component 102 and the second cable component 110B may be coupled to the second gauge component 104. The cable 112 may span or extend between the first gauge component 102 and the second gauge component 104, to assist the operator to align at least one of: the first hub 106A and the second hub 106B of the vehicle 106.

In an embodiment, the first cable component 110A may be a cable retractor that may be disposed on the first gauge component 102. The cable retractor may be configured to release the cable 112 from the first gauge component 102 towards the second gauge component 104. The second cable component 110B may be an anchor that may be disposed on the second gauge component 104. The anchor may secure one end of the cable 112. The cable 112 may span between the first gauge component 102 and the second gauge component 104, to form a levelling reference between the first gauge component 102 and the second gauge component 104. The levelling reference may be configured to align at least one of: the first hub 106A and the second hub 106B of the vehicle 106.

In another embodiment, the cable 112 may be continuously attached between the first gauge component 102 and the second gauge component 104. By way of example, and not limitation, the cable 112 may extent itself between retractable cable components (including the first cable component 110A and the second cable component 110B), when the first gauge component 102 may be arranged in proximity to the first hub 106A of the vehicle 106 and the second gauge component 104 may be arranged in proximity of the second hub 106B of the vehicle 106. Based on extension of the cable 112, the cable 112 may span between the first gauge component 102 and the second gauge component 104 to form the levelling reference configured to align at least one of: the first hub 106A and the second hub 106B of the vehicle 106. In an alternate embodiment, the first gauge component 102 and the second gauge component 104, may include a pair of cable retractors and a pair of anchors. In case of failure of one pair of the cable retractors or the anchors, the other pair of the cable retractors or the anchors may be utilized to form the levelling reference between the first gauge component 102 and the second gauge component 104.

In operation, the alignment gauge 100 may include the first gauge component 102 having the first slot 102A to receive the first hub 106A and the second gauge component 104 having the second slot 104A to receive the second hub 106B of the vehicle 106. The first hub 106A and the second hub 106B of the vehicle 106 are separated from each other, via the axle carrier 108 of the vehicle 106. The alignment gauge 100 may further include the retractable cable component 110 which may be configured to be coupled with at least one of: the first gauge component 102 and the second gauge component 104. The retractable cable component 110 may include the first cable component 110A and the second cable component 110B which may be coupled to the first gauge component 102 and the second gauge component 104, respectively. The first cable component 110A may be the cable retractor that may be configured to release the cable 112 from the first gauge component 102. The cable 112 may be secured by the anchor, disposed on the second gauge component 104. The cable 112 may further span between the first gauge component 102 and the second gauge component 104 to form the levelling reference configured to align at least one of: the first hub 106A and the second hub 106B of the vehicle 106.

Figure 1B:
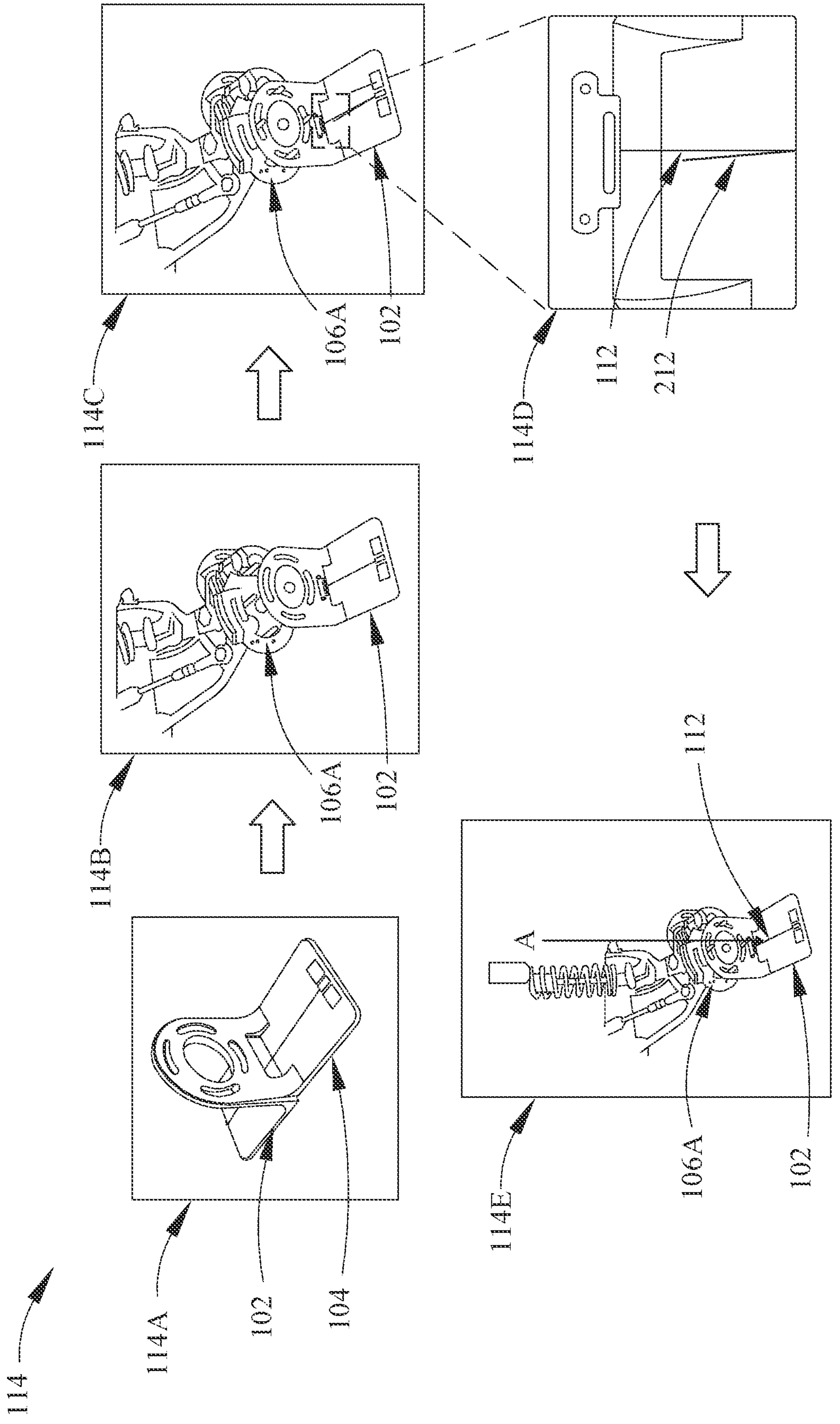
FIG. 1B is a process diagram that illustrates alignment of hub of a vehicle, in accordance with an embodiment of the disclosure.

FIG. 1B is a process diagram that illustrates alignment of hub of a vehicle, in accordance with an embodiment of the disclosure. With reference to FIG. 1B, there is shown a process diagram 114 that illustrates a process of alignment of hub of the vehicle 106, via the alignment gauge 100. The process diagram 114 may be illustrated as discrete operations of aligning the hub of the vehicle 106, operations such as 114A, 114B, 114C, 114D, and 114E. In an event of the alignment of hub (such as the first hub 106A or the second hub 106B in FIG. 1A) of the vehicle 106, in a factory or an assembly line, a plurality of outer lock nuts may not be set prior to leveling or alignment of the hub of the vehicle 106. The process of the alignment of the hub may start from 114A as shown in FIG. 1B.

At 114A, the alignment gauge 100 including the first gauge component 102 and the second gauge component 104, may be held together, via a plurality of magnetic couplers 204 (as shown in FIG. 2A), to facilitate easy transportation of the alignment gauge 100 in the factory or in the assembly line of the vehicle 106. The further operations of the plurality of magnetic couplers 204 are explained, in detail, for example, in FIG. 2A.

At 114B, at least one of: the first gauge component 102 or the second gauge component 104, may be pulled apart by an operator. The first gauge component 102 may receive the first hub 106A of the vehicle 106 and the second gauge component 104 may receive the second hub 106B of the vehicle 106. In accordance with an embodiment, the first hub 106A and the second hub 106B may be associated with at least one of: a passenger side hub or a driver side hub of the vehicle 106. Further, the first cable component 110A (as shown in FIG. 2A) may be a cable retractor that may be configured to release the cable 112 from the first gauge component 102 towards the second gauge component 104. The second cable component 110B (as shown in FIG. 2C) may be the anchor that may secure one end of the cable 112. Thereafter, the operator may further pull apart the first gauge component 102 and the second gauge component 104 that may extend the cable 112 by itself and span between the first gauge component 102 and the second gauge component 104.

At 114C, the operator may level at least one of: the first hub 106A or the second hub 106B with, at least one of: the first gauge component 102 or the second gauge component 104, respectively. In an event of the leveling of least one of: the first gauge component 102 or the second gauge component 104, the operator may slide the alignment gauge 100 (for example, the first gauge component 102 or the second gauge component 104), and may keep the hub (for example, the first hub 106A or the second hub 106B) stationary. Thereafter, in the event of leveling the alignment gauge 100 with the hub, the operator may rotate the alignment gauge 100 against the hub. By way of example, and not limitation, the operator may rotate the alignment gauge 100 either manually or using tools available in the assembly line of the vehicle 106.

Figure 4:
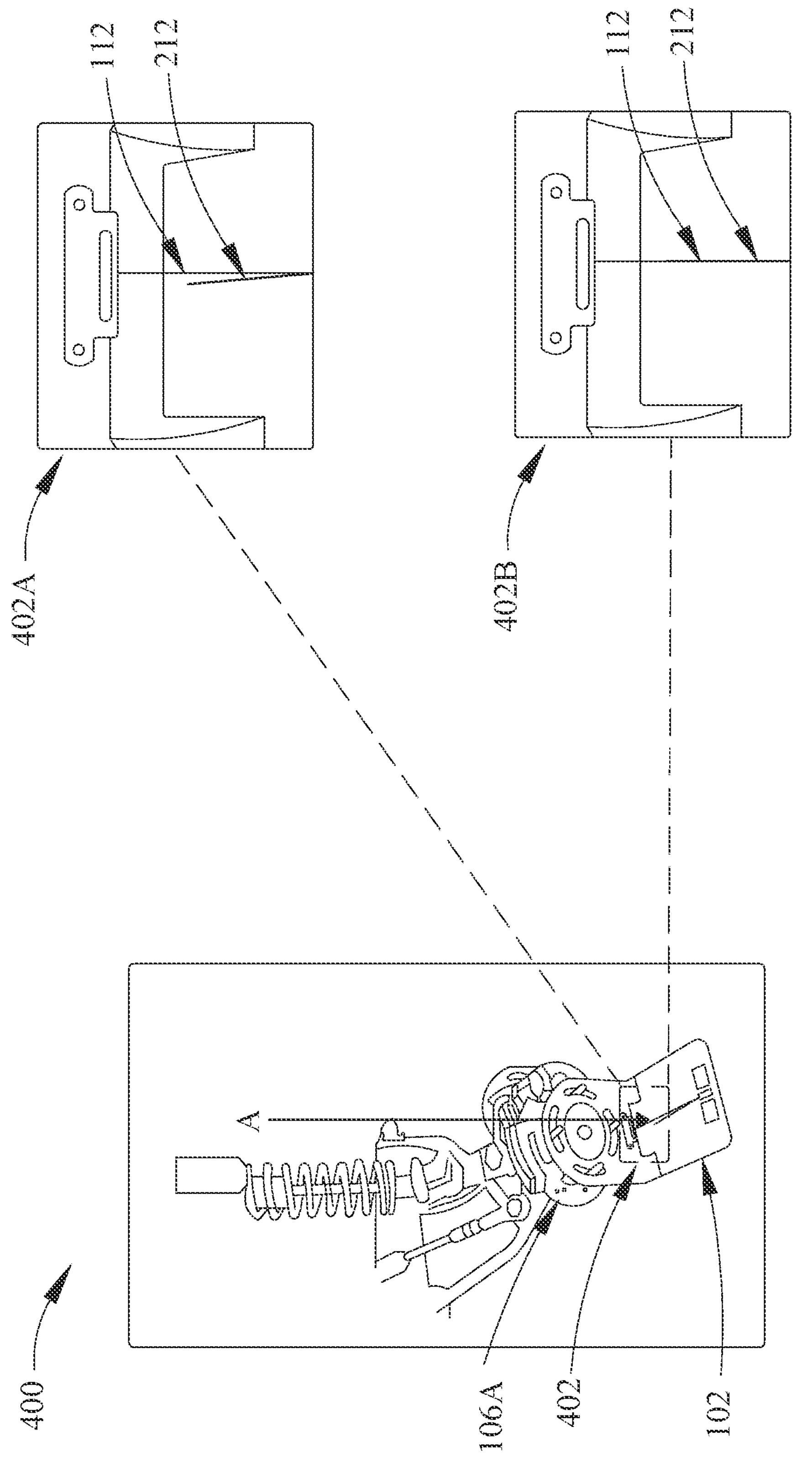
FIG. 4 illustrates an exemplary scenario of alignment of hub of a vehicle, in accordance with an embodiment of the disclosure.

At 114D, the process may further include an alignment view 402 (as shown in FIG. 4) for aligning at least one of: the first hub 106A and the second hub 106B of the vehicle 106. The alignment of the first hub 106A or the second hub 106B, is described, in detail, for example, in FIG. 4.

At 114E, the process may further include the alignment of the cable 112 with a visual marker 212 (as shown at 114D and in FIG. 2B). The operator may manually check the alignment of the cable 112 with the visual marker 212 from a top portion of the alignment gauge 100, in a direction “A” as shown in FIG. 1B. The alignment of the cable 112 with the visual marker 212 may ensure alignment of at least one of: the first hub 106A or the second hub 106B of the vehicle 106. Further operation of the alignment of the cable 112 with the visual marker 212 is described in detail, for example in FIG. 4. The operations described at 114B, 114C, 114D, and 114E may be performed by the operator for both the first hub 106A (via the first gauge component 102) and the second hub 106B (via the second gauge component 104) to provide alignment for both passenger side hub and the driver side hub of the vehicle 106.

FIGS. 2A and 2B illustrate a perspective view of a first gauge component, in accordance with an embodiment of the disclosure. FIGS. 2A and 2B are described in conjunction with FIG. 1A and FIG. 1B. With reference to the FIG. 2A, there is shown a diagram that include the first gauge component 102. The first gauge component 102 may include a first portion 200 and a second portion 202. The first portion 200 may be disposed in contact with the first hub 106A of the vehicle 106. The second portion 202 may be disposed perpendicular to the first portion 200. The first portion 200 may include a first surface 200A and a second surface 200B (shown in FIG. 2B). Similarly, the second portion 202 may include a first surface 202A and a second surface 202B (shown in FIG. 2B). The first surface 200A of the first portion 200 may include a plurality of magnetic couplers 204, which may be arranged adjacent to the first slot 102A (shown in FIG. 1A). The first surface 202A of the second portion 202 may include a pulley 206 configured to align the cable 112 (shown in FIGS. 1A and 1B) between the first gauge component 102 and the second gauge component 104. The first surface 202A of the second portion 202 may further include the retractable cable component 110 and the cable 112, which may span between the first gauge component 102 and the second gauge component 104. Further implementation of the retractable cable component 110 and the cable 112 are described, in detail, for example, in FIG. 1A.

With reference to FIG. 2B, there is shown a diagram that include the first gauge component 102. The first portion 200 may include the second surface 200B and the second portion 202 may include the second surface 202B. The second surface 200B of the first portion 200 may include a surface level indicator 208 which may be configured to indicate a level of the first hub 106A. The second surface 202B of the second portion 202 may include a first protractor plate 210 that may further include a visual marker 212. The cable 112 may be configured to align with the visual marker 212 to align at least one of: the first hub 106A or the second hub 106B of the vehicle 106. The second surface 202B of the second portion 202 may further include a slot 214 which may accommodate the pulley 206. The pulley 206 may be configured to align the cable 112 between the first gauge component 102 and the second gauge component 104. The first protractor plate 210 may be polished to a mirror finish 216 which may show a reflection of the cable 112 and mitigate a parallax effect, which may involve alignment of at least of: the first hub 106A or the second hub 106B of the vehicle 106. The second surface 202B of the second portion 202 may further include a drafted surface 218, which may be configured to allow a sag of the cable 112.

In an embodiment, the first portion 200 of the first gauge component 102 has the first slot 102A that may be configured to be coupled to the first hub 106A of the vehicle 106. The second portion 202 of the first gauge component 102 may be bent substantially perpendicular to the first portion 200. The second portion 202 of the first gauge component 102 may form the first substantially L-shaped profile, which may be configured to extend away from the first hub 106A of the vehicle 106.

The plurality of magnetic couplers 204 may be coupled with the first surface 200A of the first portion 200 and adjacent to the first slot 102A. The magnetic couplers 204 (such as, an electromagnetic, a temporary magnet, etc.) may be configured to be coupled with the first hub 106A of the vehicle 106 and control leveling of the first hub 106A. The plurality of the magnetic couplers 204 may be attached with the first hub 106A, to firmly secure the first gauge component 102 with the first hub 106A of the vehicle 106, to prevent slipping of the alignment gauge 100, in the event of aligning at least one of: the first hub 106A or the second hub 106B of the vehicle 106.

The first surface 202A of the second portion 202 may include the pulley 206 which may be configured to pass the cable 112 released from the first gauge component 102 towards the second gauge component 104. The pulley 206 may extend from the first surface 202A of the second portion 202 to the second surface 202B of the second portion 202, via the slot 214. The pulley 206 may be a movable pulley which may pass the cable 112 from the retractable cable component 110 and may span the cable 112 between the first gauge component 102 and the second gauge component 104. The pulley 206 may provide required tension to the cable 112 ensuring the cable 112 to remain straight without any tangle or bend in the cable 112. The pulley 206 may be made from a stainless-steel material to provide a high strength to pull the cable 112 which may span between the first gauge component 102 and the second gauge component 104, to form the leveling reference to align at least one of: the first hub 106A or the second hub 106B of the vehicle 106.

The second surface 200B of the first portion 200 may include the surface level indicator 208, which may be configured to indicate the level of the first hub 106A. The surface level indicator 208 may utilize fluid as a medium to indicate the level of the first hub 106A with reference to the cable 112 which span between the first gauge component 102 and the second gauge component 104. The surface level indicator 208 may be used by the operator to align at least one of: the first hub 106A and the second hub 106B of the vehicle 106 in accordance with the levelling reference.

The second surface 202B of the second portion 202 may include the first protractor plate 210 which may include the visual marker 212. The visual marker 212 may be configured to provide a reference line to allows the operator to align at least one of: the first hub 106A or the second hub 106B of the vehicle 106. The visual marker 212 may be etched or painted over the first protractor plate 210, that may remain for longer duration without fading out. The visual marker 212 may show a visual indication and the operator may align the cable 112 with the visual indication, to align at least one of: the first hub 106A or the second hub 106B of the vehicle 106. In the exemplary embodiment, the visual marker 212 may be etched or painted over a second protractor plate (not shown) associated with the second gauge component 104. The visual marker 212 over the first protractor plate 210 may have a first color which may be substantially different from a second color of the second protractor plate configured on the second gauge component 104. The different color on the first protractor plate 210 and the second protractor plate, may be facilitated for aligning the cable 112 with the visual marker 212, to align at least one of: the first hub 106A or the second hub 106B of the vehicle 106.

The first protractor plate 210 may be polished to the mirror finish 216 which may be configured to show the reflection of the cable 112 which may span between the first gauge component 102 and the second gauge component 104. The reflection of the cable 112 may allow the operator to mitigate the parallax effect that may occur between the reflection of the cable 112 and the visual marker 212. The mitigation of the parallax effect between the cable 112 and the visual marker 212 may allow easy alignment of at least one of: the first hub 106A or the second hub 106B of the vehicle 106. The alignment of the cable 112 with the visual marker 212 is further described, for example, in FIG. 4.

The second surface 202B of the second portion 202 may include the slot 214 which may accommodate the pulley 206. The slot 214 may be formed between the first surface 202A of the second portion 202 and the second surface 202B of the second portion 202. The pulley 206 may span the cable 112 from the retractable cable component 110 configured on the first surface 202A, towards the visual marker 212 on the first protractor plate 210 configured on the second surface 202B, via the slot 214. In another embodiment, the slot 214 may provide an opening that may enable easy movement for the cable 112 to roll over the pulley 206 and span the cable 112 between the first gauge component 102 and the second gauge component 104 to align at least one of: the first hub 106A or the second hub 106B.

The second surface 202B of the second portion 202 may include the drafted surface 218 which may be configured to allow the sag of the cable 112. The drafted surface 218 may be located between the first protractor plate 210 and the slot 214 in the second surface 202B of the second portion 202. The sag of the cable 112 is the vertical distance between the point of support of the cable 112 with the pulley 206 and a lowest peak point of the cable 112 which span between the first gauge component 102 and the second gauge component 104. The sag of the cable 112 may ensure optimum tension in the cable 112 which may span between the first gauge component 102 and the second gauge component 104. In the exemplary embodiment, lower the sag of the cable 112, higher may be the tension in the cable 112 which may be ideal to keep the cable 112 straight to align at least one of: the first hub 106A or the second hub 106B of the vehicle 106. In another exemplary embodiment, higher the sag of the cable 112, lesser may be the tension in the cable 112 which may form wrinkles in the cable 112. So, the drafted surface 218 may allow the operator to maintain optimum sag of the cable 112 which may span between the first gauge component 102 and the second gauge component 104 to align at least one of: the first hub 106A or the second hub 106B of the vehicle 106.

With reference to implementation of the second gauge component 104 to align at least one of: the first hub 106A or the second hub 106B of the vehicle, the functions of the second gauge component 104 may be same as the functions of the first gauge component 102, are described, for example, in FIGS. 1, 2A and 2B. Therefore, the description of the second gauge component 104 and all the associated components of the second gauge component 104, are omitted from the disclosure for the sake of brevity. For example, the second gauge component 104 may include a first portion (not shown) and a second portion (not shown), where the first portion of the second gauge component has the second slot 104A that may be configured to be coupled to the second hub 106B of the vehicle 106 and the second portion of the second gauge component 104 may be bent substantially perpendicular to the first portion of the second gauge component 104. The second portion of the second gauge component 104 may form a second substantially L-shaped profile, which may be configured to extend away from the second hub 106B of the vehicle 106.

As described with respect to the first gauge component 102, the first portion of the second gauge component 104 may have a first surface (not shown) and a second surface (not shown). The first surface of the first portion of the second gauge component 104 may include a plurality of magnetic couplers adjacent to the second slot 104A. The plurality of magnetic couplers may be configured to be coupled with the second hub 106B of the vehicle 106 and control leveling of the second hub 106B. Further, the second surface of the first portion of the second gauge component 104 may include a surface level indicator (not shown) which may be configured to indicate a level of the second hub 106B. Further, the second portion (not shown) of the second gauge component 104 may have a first surface and a second surface.

FIG. 2C is a diagram that illustrates a perspective view of a second cable component of a second gauge component, in accordance with an embodiment of the disclosure. FIG. 2C is described in conjunction with FIG. 1A, FIG. 1B, FIG. 2A, and FIG. 2B. With reference to FIG. 2C, there is shown a diagram that include the second gauge component 104. The second gauge component 104 may include a second cable component 110B.

The second surface of the second portion may include a second cable component 110B (i.e., similar to the first cable component 110A associated with the first gauge component 102). The second cable component 110B may be an anchor that may be configured to secure one end of a cable (like cable 112). The cable 112 may span between the second gauge component 104 and the first gauge component 102 that may be configured to align at least one of: the first hub 106A or the second hub 106B of the vehicle 106. Further, the second surface of the second portion of the second gauge component 104 may include the second protractor plate (not shown) that may have a visual marker (similar to the visual marker 212 on the first protractor plate 210), wherein the cable 112 may be configured to be aligned with the visual marker to align at least one of: the first hub 106A or the second hub 106B of the vehicle 106.

Figure 3:
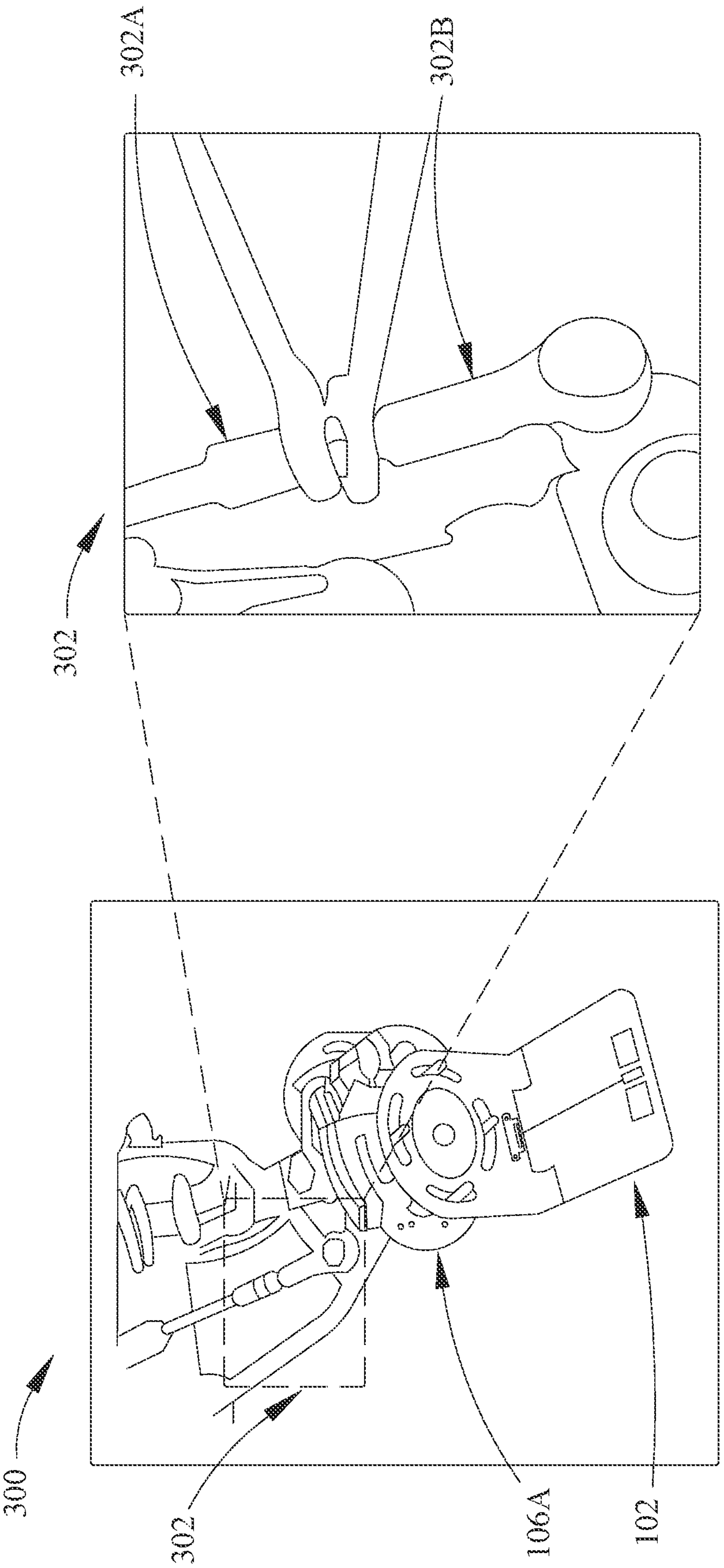
FIG. 3 is a diagram that illustrates a perspective view of an alignment event, in accordance with an embodiment of the disclosure.

FIG. 3 is a diagram that illustrates a perspective view of an alignment event, in accordance with an embodiment of the disclosure. FIG. 3 is explained in conjunction with FIGS. 1A, 1B, 2A, 2B, and 2C. With reference to FIG. 3, there is shown a diagram that indicate an alignment event 300 of the first gauge component 102. The alignment event 300 may include a tie-rod and lock-nut mechanism 302. The alignment event 300 may further include an adjustment of a toe angle of at least one of: the first hub 106A or the second hub 106B, via the tie-rod and lock-nut mechanism 302. The tie-rod and lock-nut mechanism 302 may include a tie rod 302A and a lock nut 302B configured to align at least one of: the first hub 106A or the second hub 106B of the vehicle 106. In the alignment event 300, the tie-rod and lock-nut mechanism 302 may be adjusted manually by the operator to align the cable 112 with the visual marker 212 (shown in FIG. 2B). The alignment of the cable 112 with the visual marker 212 for the alignment event 300 is further described, for example, in FIG. 4.

In the alignment event 300 of at least one of: the first hub 106A or the second hub 106B of the vehicle 106, the tie rod 302A may be rotated to adjust the toe angle that may be configured to align the cable 112 with the visual marker 212. Thereafter, when a desired toe angle may be reached, based on rotation of the tie rod 302A, the lock nut 302B may be tightened against the tie rod 302A to hold the tie rod 302A at adjusted position. In the exemplary embodiment, for aligning the first hub 106A of the vehicle 106, the tie rod 302A associated with the first hub 106A, may be rotated to align the cable 112 with the visual marker 212. In another exemplary embodiment, for aligning the second hub 106B of the vehicle 106, the tie rod 302A associated with the second hub 106B, may be rotated to align the cable 112 with the visual marker 212.

FIG. 4 illustrates an exemplary scenario of alignment of hub of a vehicle, in accordance with an embodiment of the disclosure. FIG. 4 is explained in conjunction with FIGS. 1A, 1B, 2A, 2B, 2C, and 3. With reference to FIG. 4, there is shown a diagram that include an exemplary scenario 400 which may indicate an alignment view 402 for aligning at least one of: the first hub 106A and the second hub 106B of the vehicle 106. Further, in FIG. 4, the alignment view 402 may be further illustrated as implementation of operation states, including, but not limited to, a misalignment state 402A and an aligned state 402B.

In the exemplary embodiment, the first hub 106A may be referred as a driver side hub and the second hub 106B may be referred as a passenger side hub. In the event of aligning at least one of: the first hub 106A or the second hub 106B, the operator may couple the first gauge component 102 with the first hub 106A and the second gauge component 104 with the second hub 106B. The cable 112 may span between the first gauge component 102 and the second gauge component 104 (shown in FIG. 1A). The reflection of the cable 112 may be reflected on the mirror finish 216 (shown in FIG. 2B). The first gauge component 102 with the first protractor plate 210 (shown in FIG. 2B) may be configured with the visual marker 212 and the cable 112. The visual marker 212 may show the visual indication with at least one of the first color or the second color.

In the misalignment state 402A, the first hub 106A may not be aligned with the second hub 106B. In an embodiment, the first hub 106A may be located at a first toe angle (not shown) with respect to a centerline (not shown) of the vehicle 106, and the second hub 106B may be located at a second toe angle (not shown) with respect to the centerline of the vehicle 106. In an example, the first toe angle may be higher than the second toe angle. In another example, the second toe angle may be higher than the first toe angle. By way of an example, and not limitation, to ensure smooth ride in the vehicle 106, the first toe angle of the first hub 106A should be same as the second toe angle of the second hub 106B. By way of another example, and not limitation, to ensure smooth ride in the vehicle 106, the first toe angle of the first hub 106A and the second toe angle of the second hub 106B should be at a desired toe angle with respect to the centerline of the vehicle 106. In order to validate such misalignment, the operator may view the first protractor plate 210 (shown in FIG. 2B) that may show a gap (i.e., shown in the misalignment state 402A) between the visual marker 212 and the reflection of the cable 112. The gap may be validated by the operator while looking at the first protractor plate 210 (shown in FIG. 2B) from a top portion of the first gauge component 102, in a direction "A" (as also shown in FIG. 1B).

In the aligned state 402B, the operator may align the cable 112 with the visual marker 212. The reflection of the cable 112 may allow the operator to adjust the toe angle of at least one of: the first hub 106A or the second hub 106B, via the tie-rod and lock-nut mechanism 302 (shown in FIG. 3). Further, the tie rod 302A (shown in FIG. 3) may be rotated to adjust the toe angle that may be configured to align the cable 112 with the visual marker 212. To ensure alignment of the cable 112 with the visual marker 212, the operator may look from the top portion of the alignment gauge 100 in the direction "A" and may rotate the tie rod 302A. Further, the tie rod 302A may be rotated until the cable 112 may be aligned with the visual marker 212. Thereafter, when the cable 112 is aligned with the visual marker 212 or a desired toe angle with respect to the centerline of the vehicle 106 is reached, based on rotation of the tie rod 302A, the lock nut 302B (shown in FIG. 3) may be tightened against the tie rod 302A to hold the tie rod 302A at adjusted position. To validate the alignment (as shown in the aligned state 402B without the gap of FIG. 4) of the cable 112 with the visual marker 212, the operator may manually check the alignment of the cable 112 with the visual marker 212. The alignment of the cable 112 with the visual marker 212 may ensure alignment of at least one of: the first hub 106A or the second hub 106B of the vehicle. Further operation of the tie-rod and lock-nut mechanism 302 to facilitate alignment of at least one of: the first hub 106A or the second hub 106B of the vehicle 106 are described, in detail, for example, in FIG. 3.

Figure 5:
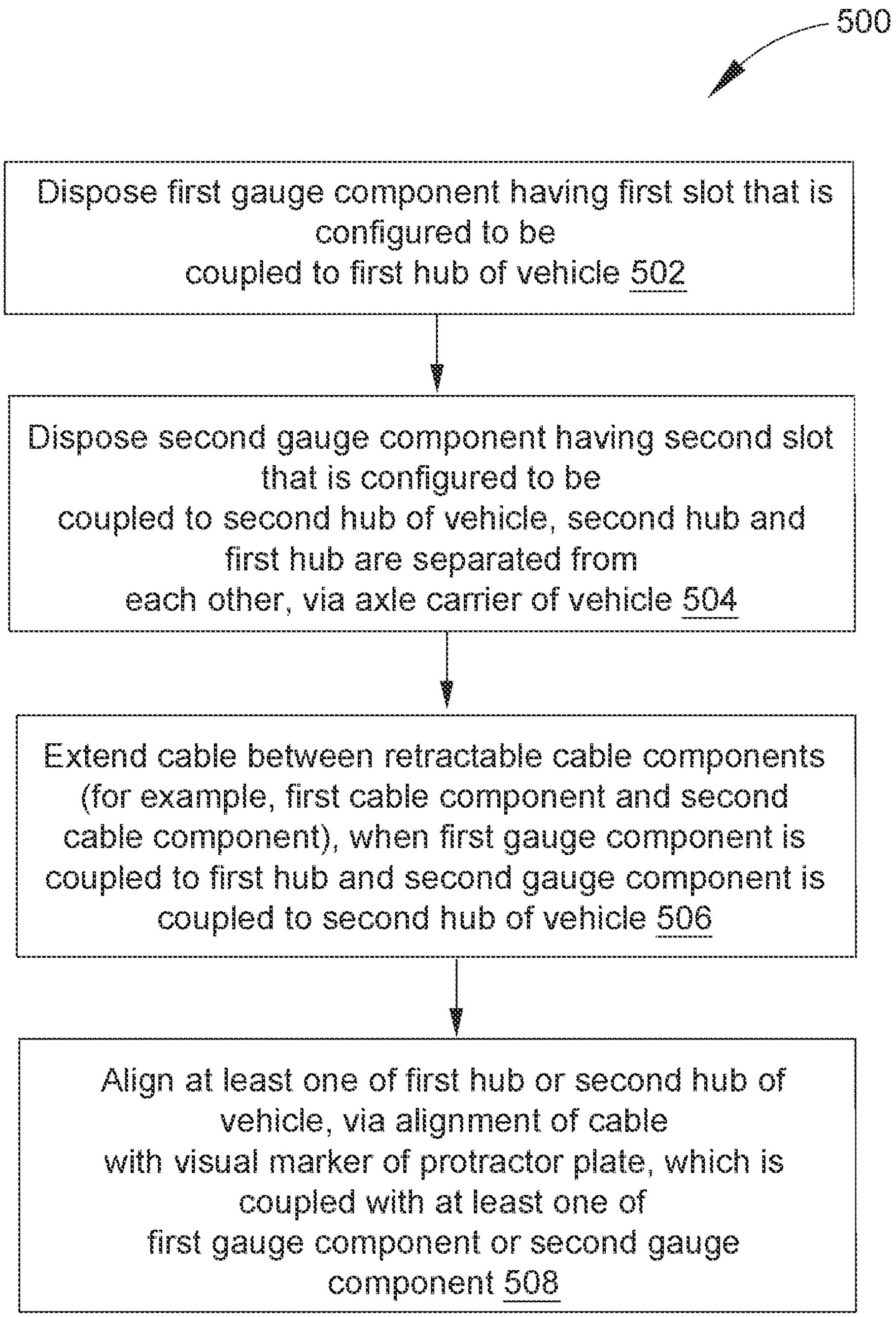
FIG. 5 illustrates a flowchart of an exemplary method for aligning hub of a vehicle, in accordance with an embodiment of the disclosure.

FIG. 5 illustrates a flowchart of an exemplary method for aligning hub of a vehicle, in accordance with an embodiment of the disclosure. FIG. 5 is explained in conjunction with FIGS. 1A, 1B, 2A, 2B, 2C, 3, and 4. With reference to FIG. 5, there is shown a flowchart 500 that depicts an exemplary method for aligning at least one of: the first hub 106A and the second hub 106B of the vehicle 106. The method illustrated in the flowchart 500 may start from 502.

In 502, the first gauge component 102 may be disposed, where the first gauge component 102 having the first slot 102A that may be coupled to the first hub 106A of the vehicle 106. In an embodiment, the alignment gauge 100 or the operator may dispose the first gauge component 102 to couple the first slot 102A of the first gauge component 102 with the first hub 106A to perform the alignment of at least one of: the first hub 106A or the second hub 106B of the vehicle 106, as described, in detail, for example, in FIGS. 1A, 1B, 2A, and 2B.

In 504, the second gauge component may be disposed, where the second gauge component 104 having the second slot 104A which may be coupled to the second hub 106B of the vehicle 106. In an embodiment, the alignment gauge 100 or the operator may dispose the second gauge component 104 to couple the second slot 104A of the second gauge component 104 with the second hub 106B to perform the alignment of at least one of: the first hub 106A or the second hub 106B of the vehicle 106, as described, in detail, for example, in FIGS. 1A, 1B, 2A, and 2B.

In 506, the cable 112 may extend itself between the retractable cable component 110 (for example, the first cable component 110A and the second cable component 110B), when the first gauge component 102 may be disposed on the first hub 106A and the second gauge component 104 may be disposed on the second hub 106B. In an embodiment, the first cable component 110A may be a cable retractor that may be disposed on the first gauge component 102 and may be configured to release the cable 112. In another embodiment, the second cable component 110B may be an anchor that may be disposed on the second gauge component and may be configured to secure one end of the cable 112. Further, the cable 112 may span between the first gauge component 102 and the second gauge component 104, that may be configured to align at least one of: the first hub 106A or the second hub 106B, as described, in detail, for example, in FIGS. 1A, 1B, 2A, and 2B.

In 508, at least one of: the first hub 106A or the second hub 106B of the vehicle 106 may be aligned, via the alignment of the cable 112 with the visual marker 212 of the first protractor plate 210 which may be coupled with at least one of: the first gauge component 102 or the second gauge component 104. In an embodiment, the alignment gauge 100 or the operator may align at least one of: the first hub 106A or the second hub 106B of the vehicle 106, via the alignment of the cable 112 with the visual marker 212 of the first protractor plate 210, as described, in detail, for example, in FIGS. 1B, 2A, 2B, and 3.

The flowchart 500 is illustrated as discrete operation of aligning hub of the vehicle 106, such as 502, 504, 506, and 508. However, in certain embodiments, such discrete operations may be further divided into additional operations, combined into fewer operations, or eliminated, depending on the particular implementation without any deviation from the scope of the disclosure.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. An alignment gauge, comprising:

a first gauge component having a first slot to receive a first hub of a vehicle;

a second gauge component having a second slot to receive a second hub of the vehicle, the second hub and the first hub are separated from each other, via an axle carrier of the vehicle;

a retractable cable component configured to be coupled with at least one of: the first gauge component or the second gauge component, and span between the first gauge component and the second gauge component, to align at least one of: the first hub or the second hub of the vehicle;

wherein the first gauge component comprises a first portion and a second portion, the first portion of the first gauge component has the first slot that is configured to be coupled to the first hub of the vehicle and the second portion of the first gauge component is bent substantially perpendicular to the first portion;

wherein the second gauge component comprises a first portion and a second portion, the first portion of the second gauge component has the second slot which is configured to be coupled to the second hub of the vehicle and the second portion of the second gauge component is bent substantially perpendicular to the first portion;

wherein the second portion of the first gauge component has a first surface and a second surface;

wherein the first surface of the second portion comprises the retractable cable component, which is configured to span a cable between the first gauge component and the second gauge component and align at least one of: the first hub or the second hub of the vehicle; and wherein the first surface of the second portion further comprises a pulley, which is configured to align the cable between the first gauge component and the second gauge component;

wherein the second surface of the second portion comprises a first protractor plate that has a visual marker, wherein the cable is configured to be aligned with the visual marker to align at least one of: the first hub or the second hub of the vehicle; and wherein the second surface of the second portion further comprises a slot to accommodate the pulley, which is configured to align the cable between the first gauge component and the second gauge component.

2. The alignment gauge according to claim 1, wherein, the first protractor plate is polished to a mirror finish to show a reflection of the cable and mitigate a parallax effect in an alignment event, which involves alignment of at least one of: the first hub or the second hub of the vehicle.

3. The alignment gauge according to claim 1, wherein, the pulley is configured to extend from the first surface of the second portion to the second surface of the second portion, via the slot formed between the first surface of the second portion to the second surface of the second portion.

4. The alignment gauge according to claim 1, wherein, the second surface of the second portion further comprises a drafted surface, which is configured to allow a sag of the cable.

5. The alignment gauge according to claim 4, wherein, the drafted surface is located between the first protractor plate and the slot in the second surface of the second portion.

6. An alignment gauge, comprising:

a first gauge component having a first slot to receive a first hub of a vehicle;

a second gauge component having a second slot to receive a second hub of the vehicle, the second hub and the first hub are separated from each other, via an axle carrier of the vehicle;

a retractable cable component configured to be coupled with at least one of: the first gauge component or the second gauge component, and span between the first gauge component and the second gauge component; and a protractor plate configured to be coupled with at least one of: the first gauge component or the second gauge component, wherein the protractor plate has a visual marker that is configured to be align at least one of: the first hub or the second hub of the vehicle.

7. A method, comprising:

disposing a first gauge component having a first slot that is configured to be coupled to a first hub of a vehicle;

disposing a second gauge component having a second slot that is configured to be coupled to a second hub of the vehicle, the second hub and the first hub are separated from each other, via an axle carrier of the vehicle;

extending a cable between retractable cable components, including a first cable component and a second cable component, when the first gauge component is coupled to the first hub and the second gauge component is coupled to the second hub of the vehicle; and aligning at least one of: the first hub or the second hub of the vehicle, via alignment of the cable with a visual marker of a protractor plate, which is coupled with at least one of: the first gauge component or the second gauge component.

* * * * *